United States Patent
Georgiadis et al.

(10) Patent No.: US 11,550,598 B2
(45) Date of Patent: Jan. 10, 2023

(54) SYSTEMS AND METHODS FOR ADDING DIGITAL CONTENT DURING AN APPLICATION OPENING OPERATION

(71) Applicant: Google LLC, Mountain View, CA (US)

(72) Inventors: Margaret Calliope Georgiadis, Palo Alto, CA (US); Patricia Moll, Sunnyvale, CA (US); Tyler Robin Pletz, Brooklyn, NY (US); Thomas Andrew Shimko, Jr., Brooklyn, NY (US); Siavash Sedigh Nejad, San Francisco, CA (US); Sara Christine Adkins, San Jose, CA (US); Long Long, Edgewater, NJ (US)

(73) Assignee: Google LLC, Mountain View, CA (US)

( * ) Notice: Subject to any disclaimer, the term of this patent is extended or adjusted under 35 U.S.C. 154(b) by 86 days.

(21) Appl. No.: 17/251,119

(22) PCT Filed: Dec. 13, 2019

(86) PCT No.: PCT/GR2019/000089
§ 371 (c)(1),
(2) Date: Dec. 10, 2020

(87) PCT Pub. No.: WO2021/116719
PCT Pub. Date: Jun. 17, 2021

(65) Prior Publication Data
US 2021/0373912 A1 Dec. 2, 2021

(51) Int. Cl.
*G06F 9/445* (2018.01)
*G06F 16/958* (2019.01)
*G06F 16/957* (2019.01)

(52) U.S. Cl.
CPC .......... *G06F 9/4451* (2013.01); *G06F 16/958* (2019.01); *G06F 16/9577* (2019.01)

(58) Field of Classification Search
CPC ... G06F 16/958; G06F 16/957; G06F 16/4451
See application file for complete search history.

(56) References Cited

U.S. PATENT DOCUMENTS

| 8,407,576 | B1 * | 3/2013 | Yin | G06F 3/0481 |
| | | | | 715/837 |
| 2009/0228922 | A1 * | 9/2009 | Haj-khalil | G06F 3/04845 |
| | | | | 725/38 |

(Continued)

FOREIGN PATENT DOCUMENTS

| JP | 2017-527925 | 9/2017 |
| JP | 2018-523102 | 8/2018 |

(Continued)

OTHER PUBLICATIONS

PCT International Search Report and Written Opinion in International Appln. No. PCT/GR2019/000089, dated Dec. 1, 2020, 9 pages.

(Continued)

*Primary Examiner* — Thu V Huynh
(74) *Attorney, Agent, or Firm* — Fish & Richardson P.C.

(57) ABSTRACT

Systems and methods are disclosed for generating for display digital content (e.g., an advertisement, a feed item, or some other information) together with digital components (e.g., branding data for the application or the publisher of the application). When the server receives, from a user device, a digital content request, the server can determine whether the digital content request was transmitted in response to an application state being changed to an active focus. Based on determining that the digital content request is being sent in response to an application state being changed to an active focus, the server generates a response that includes digital content and one or more digital components (e.g., branding data), and transmits that response to the user device. When (Continued)

the user device receives the response, the user device generates for display the digital components and the digital content.

11 Claims, 7 Drawing Sheets

(56) References Cited

U.S. PATENT DOCUMENTS

| | | | |
|---|---|---|---|
| 2010/0281042 A1* | 11/2010 | Windes | H04N 21/4882 707/769 |
| 2011/0197126 A1* | 8/2011 | Arastafar | G06F 40/103 715/243 |
| 2018/0189073 A1 | 7/2018 | Larabie-Belanger | |
| 2018/0292890 A1 | 10/2018 | Scott et al. | |

FOREIGN PATENT DOCUMENTS

| | | |
|---|---|---|
| JP | 2019-515523 | 6/2019 |
| JP | 2019-145090 | 8/2019 |

OTHER PUBLICATIONS

Notice of Allowance in Korean Appln. No. 2020-7035891, dated Jul. 8, 2022, 4 pages (with English translation).
Office Action in Japanese Appln No. 2020-569145, dated Apr. 11, 2022, 5 pages (with English translation).

* cited by examiner

SYSTEMS AND METHODS FOR ADDING DIGITAL CONTENT DURING AN APPLICATION OPENING OPERATION

CROSS-REFERENCE TO RELATED APPLICATION

This application is a National Stage Application under 35 U.S.C. § 371 and claims the benefit of International Application No. PCT/GR2019/000089, filed Dec. 13, 2019. The disclosure of the foregoing application is hereby incorporated by reference in its entirety.

BACKGROUND

User devices (e.g., smart phones and electronic tablets) have been designed to enable a user to open and close a variety of different applications, sometimes referred to as apps. While an app is loading, the publisher of the app can use the device's screen to provide information to the user.

SUMMARY

This document discusses techniques for providing information (e.g., in a form of a digital component) to a user while an application is loading. In some currently available systems, when an application open operation is received, the publisher of the application presents digital content to the user. The digital content usually does not have any identification of the application, thus a user that initiated the application may get confused as to whether the correct application is opening. This confusion can cause a user to eventually remove that application from the user device, or exit the application before it has loaded or otherwise have a focus changed to the application. In addition, when a publisher of the application elects to present digital content during loading of the application, that publisher needs to format that information to the correct dimensions of the screen, which can be difficult, especially when the received information is combined with other information.

To solve these and other problems, this document provides systems and methods for generating for display digital content (e.g., an advertisement, a feed item, or some other information) together with digital components (e.g., branding data for the application or the publisher of the application). Specifically, a system can include a server and a user device where various actions are performed. The server receives, from the user device, a digital content request. The digital content request can include data that identifies the application and can also include data that signals to the server whether the digital content has been requested in response to an application state being changed to an active focus or whether the digital content has been requested based on different condition (e.g., whether an application open command triggered the request). This data is referred to as an application parameter value. For example, the server can receive a digital content request that includes a name (or another identifier of an application) and another value (application parameter value) indicating the condition that lead to the request.

If the server determines that the digital content request is being sent in response to an application state being changed to an active focus, the server can perform various operations discussed below. The server can transmit a data request for one or more digital components that visually identify the application when displayed at the user device. Each data request can include an application identifier. For example, if the server determines (e.g., based on the received data) that the digital content request was triggered by a user input launching an application or bringing the application into the foreground, the server can receive from the user device a request for an advertisement to present to the user. When the request is received, the server can generate one or more data requests for branding information for the application so that the advertisement can be displayed with the branding information for the user to identify the application as the one to be opened.

In some implementations, the server determines that the application parameter value specifies that digital content request is being sent in response to the application state being changed to an active focus on the user device by performing the following actions. The server can retrieve the application parameter value from the digital content request. For example the application parameter value can be a text value, a numerical value, a hexadecimal value, or another suitable value. The server can determine (e.g., based on comparing the application parameter value to known parameter values) that the application parameter value indicates that the application was launched or that the application has been brought from background into foreground.

In response to the data request, the server can receive one or more identifiers for the one or more digital components. For example, the server can receive links or addresses for the digital components. In some implementations, the identifiers can include corresponding locations for retrieving the corresponding digital components. Those digital components can include text data, picture data, video data or other suitable data that visually identifies the application when displayed with the digital content (e.g., an advertisement). The server also identifies digital content for the application. For example, the server can identify an advertisement to display to the user. In some implementations, the server transmits a request to a digital content database or a digital content server for the digital content.

The server generates a digital content response that includes the one or more identifiers of the one or more digital components (e.g., branding data for the application) and an identifier for the digital content (e.g., advertisement). The digital content response, when processed by the user device, causes the user device to display the digital content and the digital component in response to the digital content request. The user device may render a composite of the digital content and the digital component for simultaneous display. For example, the server can generate an advertisement package for the user device to process. The advertisement package can include a link or an address for retrieving an advertisement and one or more links or addresses for retrieving the branding data that visually identifies the application. Because the server can provide both one or more identifiers of the one or more digital components and an identifier of the digital content as a combined digital content response, the data for display by the user device can be provided in a more consistent, reliable and uniform way. This can provide computational efficiencies in the processing of the digital content request by the user device. For example, the respective identifiers may be of corresponding formats or may provide links using corresponding communication protocols, which may reduce the number of different operations a user device needs to perform in parallel. Provision of the combined digital content response may also enable reduced data transfer in the provision of data for display by the user device. Instead of requiring further communications and input from publishers of content to the user device, the server can communicate a single digital content response combining the one or more identifiers of one or more digital components and an identifier for the digital content. This can reduce the number of communications that need to be transmitted and can enable more efficient encoding of the different identifiers in a single communication without need for replicating overheads associated with multiple communications.

In some implementations, the server uses templates to generate the digital content response. Specifically, the server can select, based on the application parameter value (e.g., based on determining that an application open command has been received), a template for the digital content (e.g., an advertisement). The template can include one or more instructions that define how the one or more digital components (e.g., the branding data) and the digital content (e.g., an advertisement) are to be positioned on a display of the user device. The server then generates a package that includes the template, the one or more instructions, the one or more identifiers for the one or more digital components, and the identifier for the digital content. For example, based on determining that the request was sent in response to an application launch command, the server can select a template that includes commands instructing the user device on how to place the selected digital content (e.g., advertisement) and the digital components (e.g., branding data identifying the application) on the display screen.

The server then transmits the digital content response to the user device. Use of a template including one or more instructions that define how the one or more digital components and the digital content are to be positioned can enable the one or more digital components and the digital content to be rendered in a more consistent, reliable and uniform way. Because the template and the digital content response, can be provided using a server which provides identifiers for both the one or more digital components and the digital content, any incompatibility associated with displaying both the one or more digital components and the digital content simultaneously can be avoided. For example, conflicting instructions from two different sources may otherwise cause a user device to attempt to render one or more digital components and digital content so as to overlap each other. This may cause unnecessary, repeated rendering of images due to the user device attempting to perform both of the conflicting instructions.

In contrast, the server, optionally with use of the template, may avoid such problems by providing improved compatibility of the data to be displayed and therefore providing increased computational efficiency by avoiding attempts to implement conflicting instructions. This may enable the one or more digital components and the digital content to be displayed consistently on a user device including a screen with a particular aspect ratio. Information defining this aspect ratio may be provided to the server by the user device in the digital content request. This may enable the server to provide instructions, for example by way of the template, which provide dimensions for display of the one or more digital components and the digital content so as to provide optimal use of the available screen space by the one or more digital components and the digital content without leading to overlap of the one or more digital components and the digital content. The template may include instructions for display of the one or more digital components and the digital content in portrait and landscape mode, which may be selectively usable depending on an orientation of the user device.

Another advantage of the disclosed system is that as a result of the actions described, the system removes states where partial screens are displayed. For example, a publisher can immediately display its digital components while the reminder of the screen is waiting for the digital content to be received and placed in an appropriate location. Although the publisher can configure the system to proceed to the application, the user experience can be imperfect (e.g., at least because there was a mostly blank screen for a time period).

The user device also performs various actions, both before a digital content request is sent to the server and after a digital content response is received from the server. Specifically, the user device detects an instruction to change an application state of an application to an active focus. For example, the user device can detect a user input (e.g., touch screen input selecting an icon) selecting an application to open. Based on detecting the instruction to change an application state to an active focus, the user device retrieves an application identifier that identifies the application, and transmits, to the server, a digital content request. The digital content request can include the identifier of the application and an application parameter value that specifies that the digital content request is being sent for digital content in response to the application state being changed to the active focus. For example, as discussed above, the application identifier can be a name of the application. In some implementations, the application identifier can be a text string, a number, a hexadecimal value, or another suitable identifier.

In response to the digital content request, the user device receives a digital content response. The digital content response can include an identifier for the digital content and one or more identifiers of one or more digital components that visually identify the application when displayed at the user device. As discussed above, each identifier for each digital component can include a link or an address for retrieving that digital component (e.g., an advertisement).

In some implementations, the user device receives a template that includes one or more instructions for displaying the digital content and the one or more digital components, the one or more identifiers of the one or more digital components, and the identifier for the digital content. The user device can process the template to retrieve the digital content identifier and the digital component identifiers from the template. The user device can also prepare to execute the instructions within the template to place the digital content and the digital components on the display screen.

The user device then transmits one or more data requests for the digital content and the one or more digital components. For example, the user device can use the links or addresses for each of the digital components and the digital content to request that content from a corresponding source (e.g., a digital component database and/or digital content server/database). The user device then receives, in response to the one or more data requests, the digital content and the one or more digital components, and generates for display the one or more digital components and the digital content.

In some implementations, when generating for display the one or more digital components and the digital content, the user device can use a staggered approach. Specifically, the user device can generate for display a loading screen for the application. The loading screen can include visual data received from the application. For example, the loading screen can have a background of the application. Subsequent to displaying the loading screen, the user device can execute a first pause command. For example, the pause command prior to loading up other screens can display for the user parts of the application.

Subsequent to executing the first pause command, the user device generates for display, in an overlay over the loading screen, the one or more digital components. For example, the overlay can include branding information for the application. The branding information can include a logo for the application, text identifying the application and/or other suitable data identifying the application. Subsequent to generating for display the one or more digital components, the user device executes a second pause command. The second pause command enables the user to see the digital components (e.g., the branding information) prior to the advertisement being displayed. Subsequent to generating for display the one or more digital components, the user device generates for simultaneous display in the overlay the digital content with the one or more digital components. At this point, the user device has displayed information to the user that identifies the application, thereby, avoiding user confusion. One or more digital components may initially indicate that the app is loading. At a defined interval subsequent to generating for display the digital content, the one or more digital components may indicate that the app is available for a user to interact with and may provide functionality enabling the user to continue to the app. Therefore, the one or more digital components may be dynamic and may be capable of user interaction while being rendered in combination with the digital content, providing improved functionality in the combined display of the one or more digital components and the digital content as a user interface.

The details of one or more techniques of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
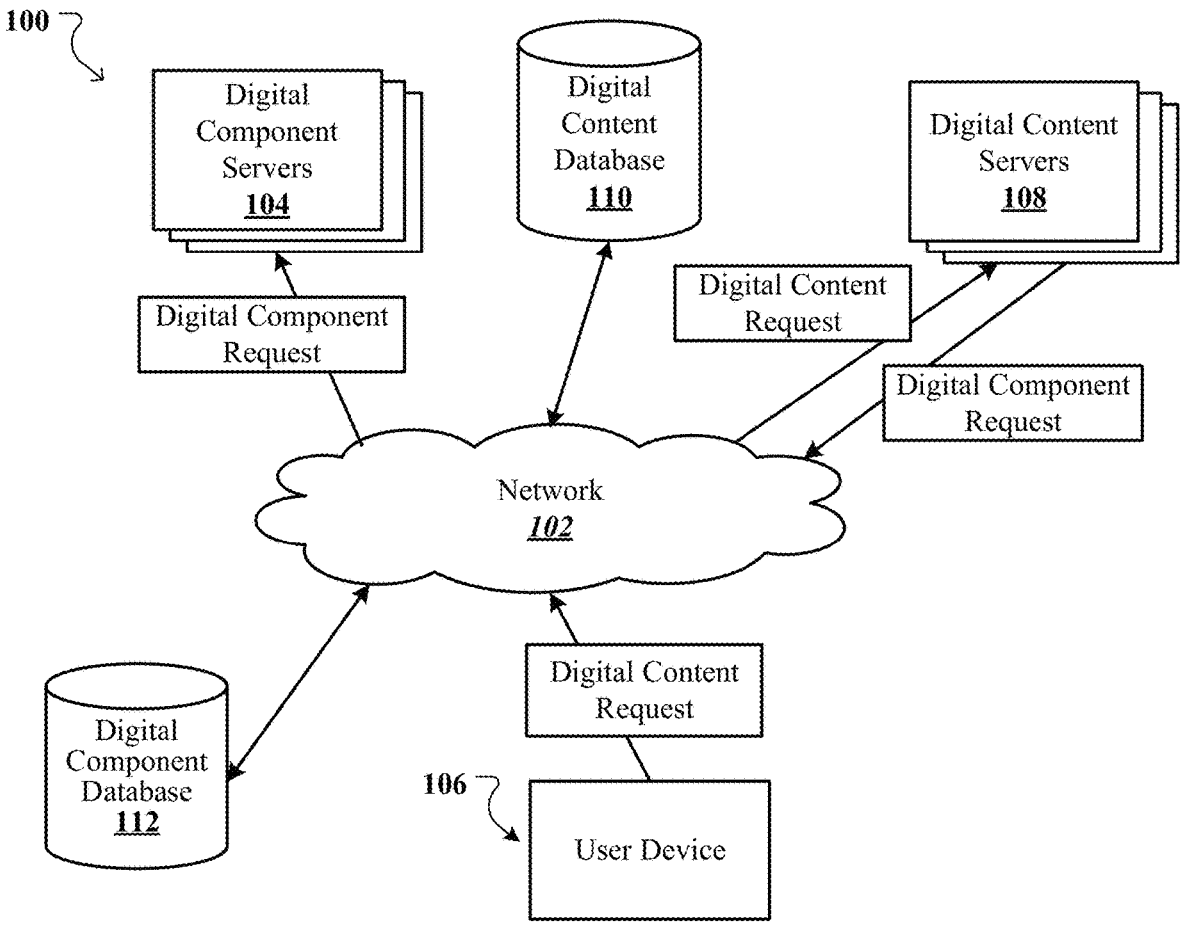
FIG. 1 is a block diagram of example components for a digital content delivery system.

This document discloses methods, systems, and devices that enable delivering digital content to a user device. FIG. 1 is a block diagram of components for a digital content delivery system. System 100 includes network 102 such as a local area network (LAN), a wide area network (WAN), the Internet, or a combination thereof. The network 102 connects various system components including digital component servers 104, digital component database 112, digital content database 110, digital content servers 108, and one or more user devices 106. The network 102 can facilitate connections for other devices (not shown).

Digital component servers 104 provide digital components for delivery to user devices (e.g., user device 106). Each of the digital component servers 104 can receive a request for a digital component, the request including data for identifying the digital component. A digital component request is sometimes referred to as a data request. The digital components can be stored in digital component database 112. Each digital component can have associated digital component metadata that identifies an application that the digital component can visually distinguish. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include identification information for visually identifying an application.

Although, the digital component servers 104 and the digital component database 112 are shown as different components, those components can be hosted by one server. In some implementations, those components can be combined into one component that receives the data request, compares the information in the data request with metadata for each of the digital components and selects one or more digital components that match the application identifier. For example, a server can compare an application identifier from the data request with application identifiers within the metadata of each stored digital component.

System 100 also includes digital content servers 108. In some implementations, a digital content server 108 can receive a digital content request from the user device 106 and process the digital content request. Each of the digital content servers 108 can also transmit digital component requests to each digital component server 104. Digital content can be stored in digital content database 110. Although the digital content servers 108 and digital content database 110 are shown as separate components, those components can be installed on one server or a set of servers. System 100 also includes user device 106. A user device can be an electronic device that enables a user to execute applications. A user device can be a laptop computer, smart phone, an electronic tablet, or another suitable device The digital content delivery system can include hardware, software, or a combination of hardware and software. In some implementations, the digital content delivery system can be configured on one or more of the digital content servers 108. Although the digital content servers 108 are recited as including multiple servers, the digital content servers in certain instances can include one logical server that performs the actions of the digital content delivery system.

In addition, the digital content delivery system can include components on user device 106. One or more of the digital content servers 108 can receive the digital content request from the user device 106 and process the received digital content request. The user device 106 can communicate with the digital content servers 108 through network 102 to transmit and receive various data. In addition, the user device 106 can communicate with digital component servers 104 and/or digital component database 112 to request and receive digital components. Although both digital component servers 104 and the digital content servers 108 are shown as multiple servers, each of these component can be a single logical or physical server.

Figure 2:
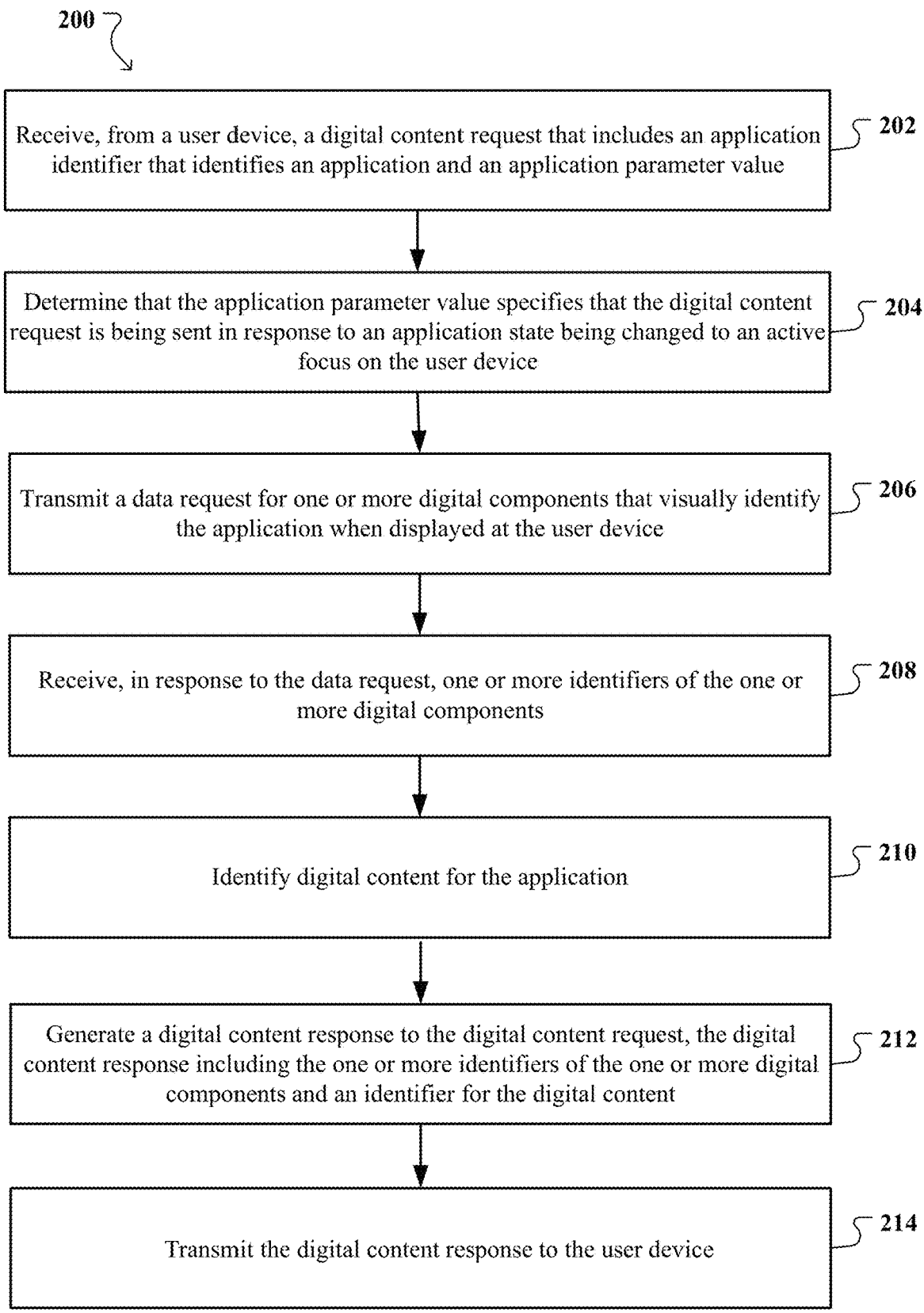
FIG. 2 is a block diagram of actions that a server can take when delivering digital content.
Figure 3:
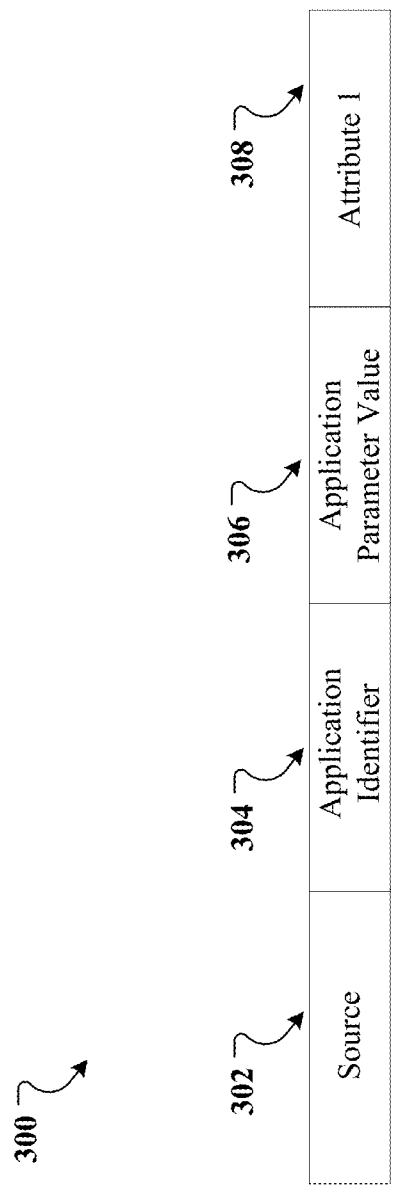
FIG. 3 shows an example of a data structure for a digital content request.

FIG. 2 is a block diagram of actions that a server can take when delivering digital content. The actions of FIG. 2 can be executed on the one or more digital content servers 108. At 202, a server (e.g., a digital content server 108) receives, from a user device, a digital content request that includes an application parameter value and an application identifier that identifies an application. FIG. 3 shows an example of a data structure for a digital content request. The digital content request 300 can include a source 302 of the request. For example, the source can be an identifier of the user device 106. In some implementations the identifier can be an Internet Protocol address assigned to the user device (e.g., user device 106). In some implementations, the source can be a number or a hexadecimal value identifying the user device from which the digital content request was received. The digital content request also includes an application identifier 304. The application identifier uniquely identifies the application to the server and to other components of system 100. The application identifier can be a name of the application, a hexadecimal value, a number, or another suitable identifier for unique identifying the application.

In addition, the digital content request includes an application parameter value 306. The application parameter value can identify the trigger for the digital content request. For example the application parameter value can indicate that the digital content request is being sent in response to an application state being changed to an active focus. The term 'active focus' may be used interchangeably with the term 'active status'. The application parameter value can be a text value, a hexadecimal value, a number, or another suitable value. In some implementations, the server and the user device can include a table storing application parameter values and corresponding triggers. For example, an application parameter value of "App Open" can indicate that the digital content request is being sent in response to an application state being changed to an active focus. A different application parameter value can indicate that an internal function of the application is the trigger for the digital content request. The digital content request can include other attributes as shown by attribute 1 field 308 of data structure 300. Other information can include display screen dimensions, display screen resolution, and other suitable data of the user device.

Referring back to FIG. 2, at 204, the server (e.g., a digital content server 108) determines that the application parameter value specifies that the digital content request is being sent in response to an application state being changed to an active focus on the user device. In some implementations, an application state being changed to an active focus can include the application being launched or the application being brought from background processing state into foreground processing state. The user device can generate different application parameter values for these instances. The server can retrieve the application parameter value from the digital content request, and determine that the application parameter value indicates that the application was launched or that the application has been brought from background into foreground. In some implementations, the server can compare the application parameter value to known application parameter values stored in a table.

Figure 4:
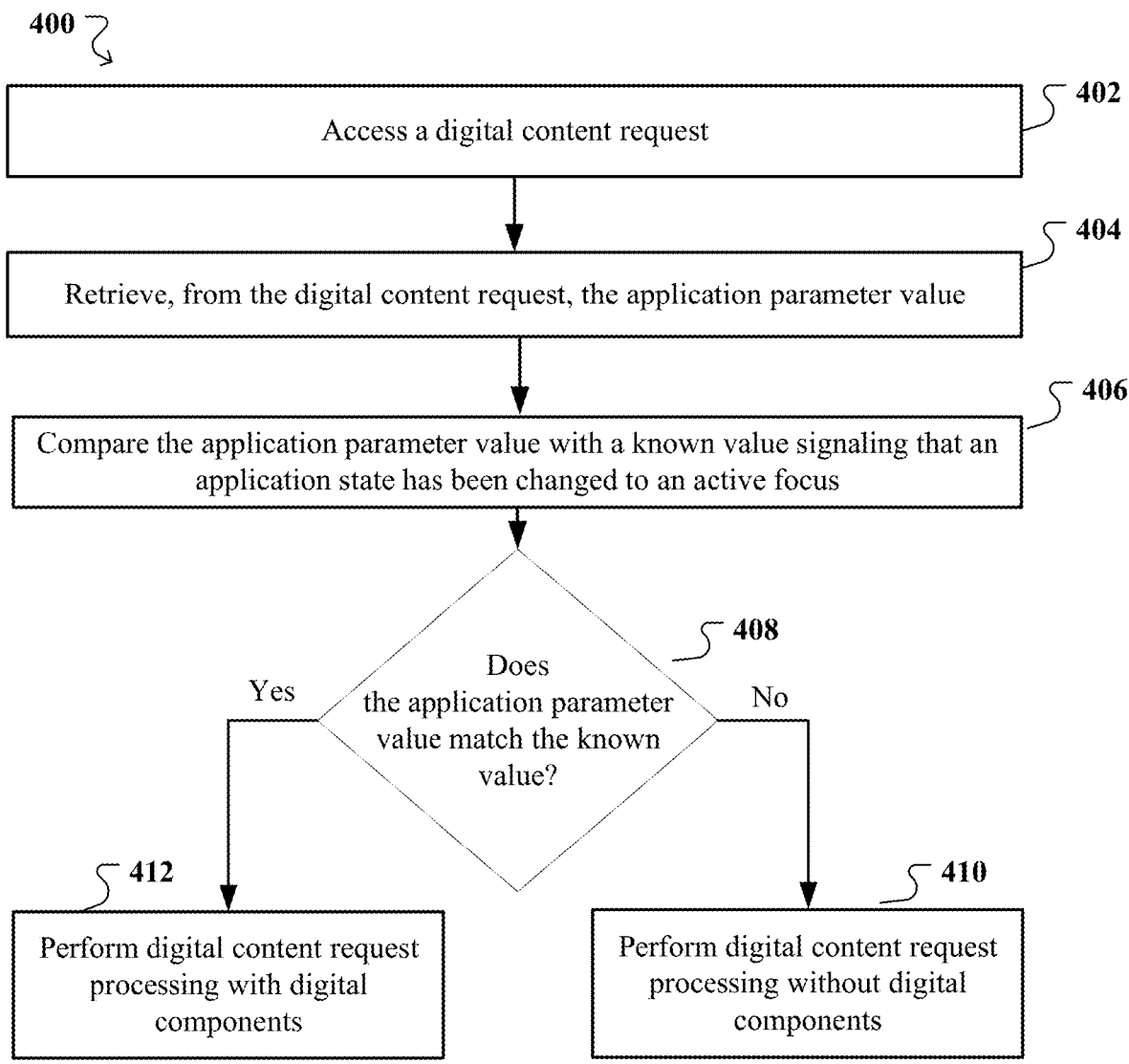
FIG. 4 is a block diagram of actions for determining whether the application parameter value signals that an application state has been changed to an active focus.

FIG. 4 is a block diagram 400 of actions for determining whether the application parameter value signals that an application state has been changed to an active focus. At 402, the server (e.g., a digital content server 108) accesses a digital content request. For example, the server can access the digital content request that resides in memory. At 404, the server (e.g., digital content server 108) retrieves, from the digital content request the application parameter value. For example, the server can use an application programming interface ("API") to retrieve the application parameter value from the digital content request. In some implementations, the digital content request can be a data structure that the server can navigate to retrieve the digital content request.

At 406, the server (e.g., digital content server 108) compares the application parameter value with a known value signaling that an application state has been changed to an active focus. For example, the server can store a mapping (e.g., a table) between known application parameter values and corresponding triggers. The server can retrieve the mappings and compare the retrieve application parameter value with each application parameter value in a corresponding mapping to determine whether the received application parameter value signals that an application state has been changed to an active focus.

At 408, the server (e.g., digital content server 108) determines whether the application parameter value matches the known value. If the application parameter value does not match the known value for signaling that an application state has been changed to an active focus, process 400 moves to 410, where the server performs digital content request processing without digital components. If the application parameter value matches the known value for signaling that an application state has been changed to an active focus, process 400 moves to 412, where the server performs digital content request processing with the digital components as discussed further in relation to FIG. 2.

At 206, the server (e.g., a digital content server 108) transmits a data request for one or more digital components that visually identify the application when displayed at the user device. The data request can include an application identifier (e.g., the application identifier received in the digital content request). In some implementations, the application identifier can be determined from the application identifier received in the digital content request. For example, if the digital content request includes a name of the application as the application identifier, the server can determine a corresponding application identifier (e.g., a number, a hexadecimal value, or another suitable identifier) that identifies the application at a server where the digital components are stored (e.g., at the digital component server 104 and/or digital component database 112).

At 208, the server (e.g., a digital content server 108) receives, in response to the data request, one or more identifiers of the one or more digital components. In some implementations, the digital content server 108 transmits a digital component request to one or more digital component servers 104 through network 102. Each of the digital component servers 104 can receive a request and retrieve from the request the application identifier. Using the application identifier, each of the digital component servers 104 can perform a lookup of digital components that match the application identifier. Each of the digital components can include an identifier that can be used to retrieve that digital component. Thus, the digital component server responding to the digital component request can include, in the response, a location for retrieving each of the matching digital components. For example, the location can be an address of the digital component database 112 and an identifier of the digital component. Based on the address and the identifier, the digital component can be identified by the digital component database 112 and retrieved for transmission. In some implementations, each identifier can be a link for retrieving the corresponding digital component or a value (e.g., decimal, hexadecimal, text, or another suitable value) that can be used to identify the corresponding digital component.

At 210, the server (e.g., digital content server 108) identifies digital content for the application. For example, the server can identify digital content for the application based on the name of the application or the type of the application. As used throughout this document, the phrase "digital content" refers to a discrete unit of digital information (e.g., a video clip, audio clip, multimedia clip, image, text, or another unit of content). Digital content can electronically be stored in a physical memory device as a single file or in a collection of files, and digital content can take the form of video files, audio files, multimedia files, image files, or text files and include advertising information, such that an advertisement is a type of digital content. In some implementations, the server may fail to receive the one or more digital components or the digital content. In those implementations, the server can identify other information related to the application and use that information to send to the client to identify the application. The other information can include textual information stored on the server. In some implementations, the server can include, for example, in a template, an instruction to the client to use application information known to the client instead of the digital components. In the implementations where the digital content is not received, the server can return a response to the client instructing the application to replace the digital content with other identifying information. In some implementations, when identifying digital content, the server can dynamically adjust which digital content to select based on various parameters. For example, the server can use frequency limits as to which digital content is selected.

At 212, the server (e.g., a digital content server 108) generates a digital content response to the digital content request, the digital content response including the one or more identifiers of the one or more digital components and an identifier for the digital content. When processed by the user device, the digital content response causes the user device to display the digital content and the one or more digital components. In some implementations, the server can use one or more templates when generating a digital content response. Specifically, the server can select, based on the application parameter value, a template for the digital content. The template can include one or more instructions that define how the one or more digital components and the digital content are to be positioned on a display of the user device. The server can then generate a package that includes the template with the one or more instructions, the one or more identifiers for the one or more digital components, and the identifier for the digital content.

Figure 5:
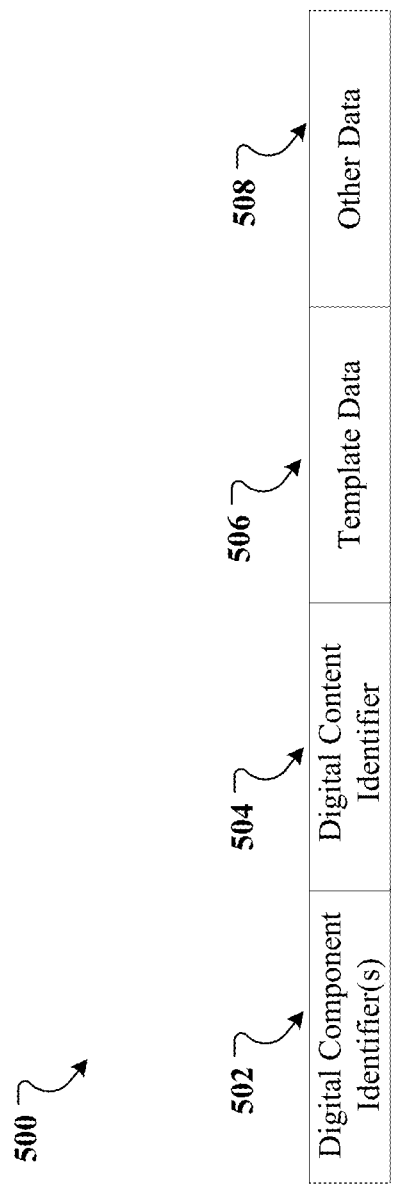
FIG. 5 shows an example of a data structure for a digital content response.

At 214, the server (e.g., a digital content server 108) transmits the digital content response to the user device. For example, the server can transmit the digital content response to the source 302 as shown in FIG. 3. FIG. 5 shows an example of a data structure 500 for a digital content response. Field 502 includes one or more digital component identifiers. As discussed above, a digital component identifier can be a link for retrieving the corresponding digital component, or another value that enables a user device to request the corresponding digital component. Field 504 can include the digital content identifier that enables a user device to retrieve the digital content for displaying to the user. Field 506 includes template data that instructs the user device as to how the digital content and the one or more digital components should be displayed on the screen of the user device. Field 508 is optional and can include other data that can be useful to the user device in displaying the digital content and the digital components. For example, field 508 can include metadata for digital components and/or digital content.

Figure 6:
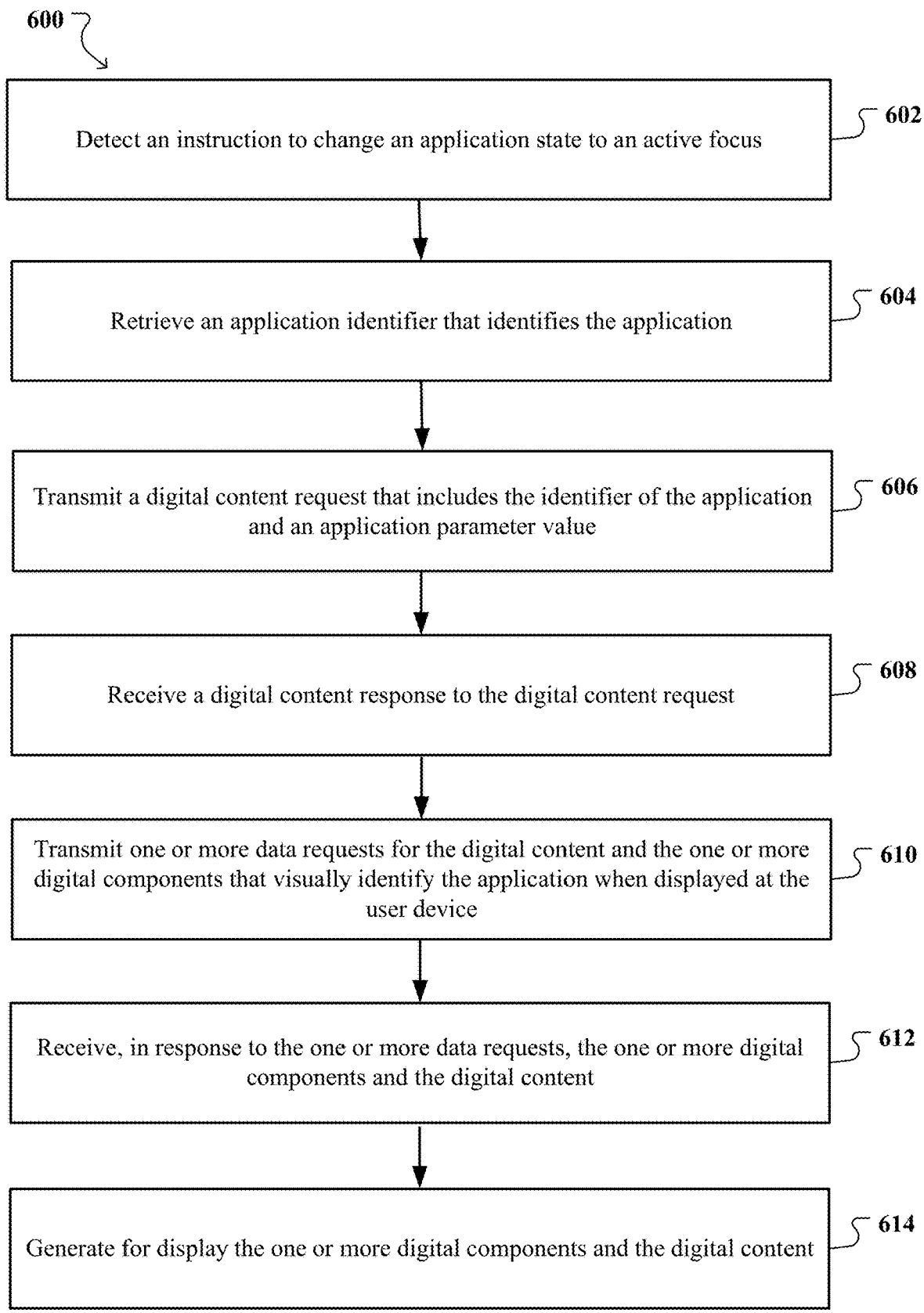
FIG. 6 is a block diagram of actions that a user device can take when receiving digital content.

At least a portion of the user delivery system can reside on a user device. FIG. 6 is a block diagram of actions that a user device can take when receiving digital content. At 602, the user device (e.g., user device 106) detects an instruction to change an application state to an active focus. For example, the user device can be an electronic tablet or a smart phone that includes a touch screen display. The user device can receive user input in the form of touch input in a specific place on the display that includes an icon of the application. In response to receiving a touch input, the user device can make the detection. In some implementations, the input can be an input using a pointing device (e.g., a computer mouse).

At 604, the user device (e.g., user device 106) retrieves an application identifier that identifies the application. For example, the application identifier can be the name of the application or another suitable value. The user device can retrieve the application identifier from metadata corresponding to the application. At 606, the user device (e.g., user device 106) transmits a digital content request that includes the identifier of the application and an application parameter value. The application parameter value specifies that the digital content request is being sent for digital content in response to the application state being changed to the active focus. The digital content request can be the same request as described in relation to FIG. 2. In some implementations, actions 604 and 606 are triggered by detecting an instruction to change an application state of an application to an active focus. The user device 106 can transmit the digital content request to the digital content servers 108.

At 608, the user device (e.g., user device 106) receives a digital content response to the digital content request. The digital content response can include an identifier for the digital content and one or more identifiers of one or more digital components that visually identify the application when displayed at the user device. As discussed above in relation to FIG. 2, the digital content server 108 can identify digital content and one or more digital components for the user device and transmit that data together with a template. The user device can receive the template that includes one or more instructions for displaying the digital content and for displaying the one or more digital components, the one or more identifiers of the one or more digital components, and the identifier for the digital content.

At 610, the user device (e.g., user device 106) transmits one or more data requests for the digital content and the one or more digital components that visually identify the application when displayed at the user device. For example, the user device can transmit a number of requests for the digital content and the one or more digital components. The request for the digital content can be transmitted to the digital content database 110. The request can include an identifier of the digital content that the digital content database can use to identify the corresponding digital content, retrieve that content and transmit that digital content to the user device. The user device can also generate a request for each digital component and transmit each of request to the digital component database 112. Each request can include an identifier of the corresponding digital component so that the digital component database 112 can identify the correct digital component, retrieve that digital component, and transmit that digital component to the user device.

Figure 7:
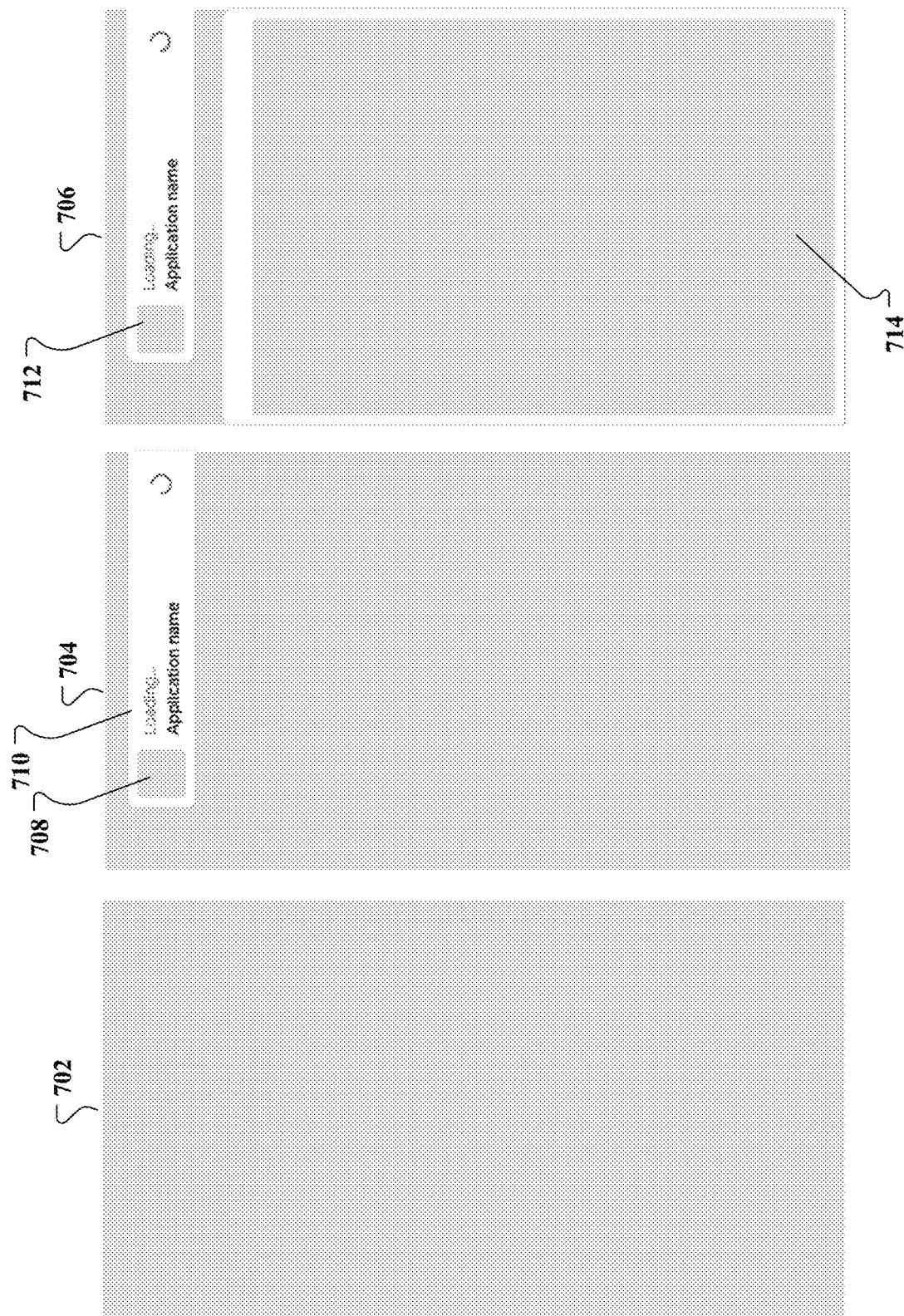
FIG. 7 illustrates screens that can be displayed on a user device when displaying digital content and one or more digital components.

At 612, the user device (e.g., user device 106) receives, in response to the one or more data requests, the one or more digital components. The digital components can be text, video, picture, and other suitable data. The digital content can, for example, be an advertisement. At 614, the user device (e.g., user device 106) generates for display the one or more digital components and the digital content. FIG. 7 illustrates screens that can be displayed on a user device when displaying digital content and the digital components. In some implementations the user device generates for display a loading screen for the application. The loading screen can include visual data received from the application. Screen 702 can be an example of a loading screen for the application. Although no background is illustrated on screen 702, the user device can generate for display a background screen from the application.

Subsequent to displaying the loading screen, the user device can execute a first pause command. The first pause command can be of a threshold duration (e.g., 1 second). Subsequent to executing the first pause command, the user device can generate for display, in an overlay over the loading screen, the one or more digital components. Screen 704 illustrates an overlay that includes an area with a text digital component 710 that includes an application name and a picture digital component that includes a picture corresponding to the application (e.g., an application icon).

Subsequent to generating for display the one or more digital components, the user device can execute a second pause command. The second pause command can be of a time duration equal to that of the first command (e.g., one second) or of a different time duration (e.g., two seconds). In some implementations the pause command may be of a variable duration. A first duration can be set for pre-cached digital content and a second duration can be set for digital content that is not pre-cached. Subsequent to generating for display the one or more digital components, the user device generates for simultaneous display in the overlay the digital content with the one or more digital components. Screen 706 illustrates a digital component area 712 that includes a text digital component and a picture digital component. In addition, screen 706 includes area 714 that displays digital content (e.g., an advertisement) simultaneously with area 712. In some implementations area 712 can include an interactive element that can be selected. For example, the interactive element can include text or other symbols to signal to the user an action that the system takes when the element is selected. For example, the interactive element can include a label "proceed to application" that signals to the user that selecting the element will remove the advertisement from the display and enable the user to proceed to the application. If the user device receives a selection of the interactive element, the user device can determine whether the application has loaded. If the application loaded, the user device can remove the digital content and the digital components from the screen and proceed to display the application. If the application has not loaded yet, the user device can perform one or more functions. For example, the user device can remove the digital content and leave the digital components in place.

In some implementations, the digital content delivery system can be implemented using one or more application programming interfaces (API). An API can be built that can be installed on both the user device and the server (e.g., digital content server(s) and/or digital component server(s)). Additionally or alternatively, multiple APIs can be built, one for each digital content server, another for a user device, and another for a digital component server. The digital content delivery system on the user device can include programing to submit digital content requests to the API on the server side. In addition, execution code can be created for an intermediary server to submit data requests to the server. A second API can be created for each digital content server to receive digital content requests and process those digital content requests. A third API can be created for each digital component server to receive digital component requests and process those digital components requests These API can be combined in some implementations.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium, or a non-transitory computer storage medium, may be referred to as a computer-readable medium. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, flash drivers, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. A user device or a server can be a computer.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on an electronic device having a display device, e.g., a CRT (cathode ray tube), OLED (organic light-emitting diode) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. For example, a user device can be a client and a digital content server or a digital component server can be a server. The terms 'user device' and 'client device' may be used interchangeably. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
receiving, from a user device, a digital content request comprising an application identifier that identifies an application installed at the user device and an application parameter value of the application installed at the user device;
determining that the application parameter value specifies that the digital content request is being sent in response to an application state of the application installed at the user device being changed to an active focus on the user device; and
in response to the determining:
transmitting a data request for one or more digital components that visually identify the application when displayed at the user device, wherein the data request comprises the application identifier;
receiving, in response to the data request, one or more identifiers for the one or more digital components;
identifying digital content for the application;
generating a digital content response to the digital content request, wherein the digital content response includes the one or more identifiers of the one or more digital components and an identifier for the digital content, wherein the digital content response, when processed by the user device, causes the user device to display the digital content and the one or more digital components in response to receiving the digital content request; and
transmitting the digital content response to the user device.

2. The method of claim 1, wherein generating the digital content response comprises:
selecting, based on the application parameter value, a template for the digital content, wherein the template comprises one or more instructions that define how the one or more digital components and the digital content are to be positioned on a display of the user device; and
generating a package comprising the template, the one or more instructions, the one or more identifiers for the one or more digital components, and the identifier for the digital content.

3. The method of claim 1, wherein determining that the application parameter value specifies that digital content request is being sent in response to the application state being changed to an active focus on the user device comprises:
retrieving the application parameter value from the digital content request; and
determining that the application parameter value indicates that the application was launched or that the application has been brought from background into foreground.

4. The method of any of claim 1, wherein receiving, in response to the data request, the one or more identifiers for the one or more digital components comprises receiving one or more locations for retrieving the one or more digital components.

5. A method comprising:
detecting, on a user device, an instruction to change an application state of an application installed on the user device to an active focus; and
based on detecting the instruction to change the application state of the application installed on the user device to an active focus:
retrieving an application identifier that identifies the application;
transmitting, to a server, a digital content request comprising the identifier of the application and an application parameter value that specifies that the digital content request is being sent for digital content in response to the application state being changed to the active focus;
receiving a digital content response to the digital content request, wherein the digital content response includes an identifier for the digital content and one or more identifiers of one or more digital components that visually identify the application when displayed at the user device;
transmitting one or more data requests for the digital content and the one or more digital components that visually identify the application when displayed at the user device;
receiving, in response to the one or more data requests, the one or more digital components and the digital content; and
generating for display the one or more digital components and the digital content.

6. The method of claim 5, wherein receiving the digital content response to the digital content request comprises receiving a template comprising one or more instructions for displaying the digital content and the one or more digital components, the one or more identifiers of the one or more digital components, and the identifier for the digital content.

7. The method of claim 5, wherein generating for display the one or more digital components and the digital content comprises:
generating for display a loading screen for the application, wherein the loading screen comprises visual data received from the application;
subsequent to displaying the loading screen, executing a first pause command;
subsequent to executing the first pause command, generating for display, in an overlay over the loading screen, the one or more digital components;
subsequent to generating for display the one or more digital components, executing a second pause command; and
subsequent to generating for display the one or more digital components, generating for simultaneous display in the overlay the digital content with the one or more digital components.

8. A non-transitory computer storage medium encoded with a computer program, the program comprising instructions that when executed by data processing apparatus cause the data processing apparatus to perform operations comprising:
receiving, from a user device, a digital content request comprising an application identifier that identifies installed at the user device and an application parameter value of the application installed at the user device;
determining that the application parameter value specifies that the digital content request is being sent in response to an application state of the application installed at the user device being changed to an active focus on the user device; and
in response to the determining:
transmitting a data request for one or more digital components that visually identify the application when displayed at the user device, wherein the data request comprises the application identifier;

receiving, in response to the data request, one or more identifiers for the one or more digital components;

identifying digital content for the application;

generating a digital content response to the digital content request, wherein the digital content response includes the one or more identifiers of the one or more digital components and an identifier for the digital content, wherein the digital content response, when processed by the user device, causes the user device to display the digital content and the one or more digital components in response to receiving the digital content request; and transmitting the digital content response to the user device.

9. The non-transitory computer storage medium of claim 8, wherein generating the digital content response comprises:

selecting, based on the application parameter value, a template for the digital content, wherein the template comprises one or more instructions that define how the one or more digital components and the digital content are to be positioned on a display of the user device; and generating a package comprising the template, the one or more instructions, the one or more identifiers for the one or more digital components, and the identifier for the digital content.

10. The non-transitory computer storage medium of claim 8, wherein determining that the application parameter value specifies that digital content request is being sent in response to the application state being changed to an active focus on the user device comprises:

retrieving the application parameter value from the digital content request; and determining that the application parameter value indicates that the application was launched or that the application has been brought from background into foreground.

11. The non-transitory computer storage medium of any of claim 8, wherein receiving, in response to the data request, the one or more identifiers for the one or more digital components comprises receiving one or more locations for retrieving the one or more digital components.

* * * * *